United States Patent Office 3,652,681
Patented Mar. 28, 1972

3,652,681
ALPHA-HALO SUBSTITUTED ASYMMETRICAL DIACYL PEROXIDES
Donald W. Wood, San Pablo, Calif., assignor to Argus Chemical Corporation, Brooklyn, N.Y.
No Drawing. Filed Oct. 16, 1967, Ser. No. 675,360
Int. Cl. C07c 73/02
U.S. Cl. 260—610 D                      4 Claims

ABSTRACT OF THE DISCLOSURE

Asymmetrical diacyl and aroyl-acyl organic peroxide polymerization initiators characterized by the presence of an acyclic acyl group of four or more carbon atoms in which the alpha carbon atom is substituted with one or more bromine and/or chlorine atoms.

---

This invention relates to organic peroxide initiators particularly useful for the polymerization of ethylenically unsaturated monomers such as vinyl chloride. More particularly, it relates to asymmetrical diacyl and aroyl-acyl peroxides characterized by the presence of a halogen substituted at the alpha carbon atom of one of the acyl groups.

Symmetrical and asymmetrical diacyl organic peroxide initiators are reported in the literature including those containing halogen substituents. The present invention provides a specific group of halo substituted diacyl and aroyl-acyl peroxides which have been found to be substantially more efficient as an initiator of ethylenically unsaturated monomers than any of the analogous materials that have been known or used. In essence, the improved results of the present invention are obtained with asymmetrical diacyl and aroyl-acyl peroxides in which at least one acyl group comprises an acyclic group of at least 4 carbon atoms substituted at the alpha carbon atom with at least one halogen atom selected from bromine and chlorine. Diacyl and aroyl-acyl peroxides meeting this requirement have been found to be substantially superior as an initiator for the polymerization of ethylenically unsaturated monomers as compared with such closely related materials as symmetrical diacyl peroxides which are symmetrically substituted with halogens at the alpha carbon atoms.

In the preferred embodiment the organic peroxides of this invention may be defined by the following formula:

$$R-\overset{O}{\underset{\|}{C}}-O-O-\overset{O}{\underset{\|}{C}}-\overset{X}{\underset{Y}{C}}-(CH_2)_n-CH_3$$

where R is an organic radical having up to about 20 carbon atoms provided the atom bonded directly to the adjacent carbonyl group is free from halogen substitution; X and Y are individually selected from the group consisting of the chlorine, bromine and hydrogen atoms, provided at least one of said X and Y is a chlorine or bromine atom; and $n$ is a positive integer from 1 to about 18.

Any compound falling within the above formula is contemplated within the present invention since it has the requisite halo substitution. Thus, R may be an aryl group such as a phenyl or naphthyl group which may be unsubstituted or substituted with hydrocarbons as well as non-hydrocarbons such as halogen or hydroxyl groups. R may also be an aliphatic group of the saturated type or unsaturated type containing one or more double or triple bonds so as to include such groups as the pentenyl group and octynyl group. Non-hydrocarbon aliphatic groups are also contemplated so that R may contain such groups as an epoxy group and be for example an epoxy decanyl group. In a non-hydrocarbon aliphatic group containing oxygen, the oxygen may alternatively be present as an ether linkage or as part of an ester group. Where R is an aliphatic group it may be in the form of a straight or branched chain as well as a cyclic structure such as a cyclohexyl group or a tetrahydrobenzyl group. In the preferred embodiment R is an alkyl group such as the methyl group, but this is due to the availability of such materials commercially and at low cost as much as for any other reason. In short, R is contemplated as any organic radical except the specific radical that is present on the other side of the molecule which would thereby render the molecule symmetrical. For this reason R is defined above as being free from halogen substituents on the atom next to the carbonyl group, the presence of which could render the molecule symmetrical.

In the above definition of the preferred molecule the limitation of maximum numbers of carbon atoms is for the most part a practical limitation rather than a technical one. Where the molecules are substantially larger than indicated, the active oxygen content becomes so low as to become impractical for use as a polymerization initiator.

With respect to the half of the molecule containing the alpha halo substitution, virtually any structure is contemplated provided at least 4 carbon atoms are present (including the carbonyl group) and the alpha carbon atom is substituted as indicated. The balance of the acyl group may take the form of a straight or branched chain as shown. In the broader aspects, this side of the molecule beyond the alpha carbon atom may be cyclic instead of acyclic and may also contain non-hydrocarbon structure such as halogen atoms, epoxy groups, ester groups and ether linkages.

The alpha halo substituted molecule desired is suitably prepared by a conventional base catalyzed reaction between a selected acid chloride and a selected peracid in accordance with the following equation:

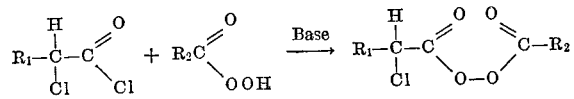

By selecting starting materials having appropriate groups for $R_1$ and $R_2$, any of the variations in the end molecule desired are obtained. In the reaction shown, the alpha carbon atom of the acid chloride is substituted with a halogen. It will be appreciated that the alpha carbon atom of the peracid could alternatively have been the starting material containing the halogen substitution and compounds within the present invention would also be obtained.

Preparation of the acid chloride or peracid starting material containing a halo substituted alpha carbon atom are readily prepared by the usual halogenation reactions as follows:

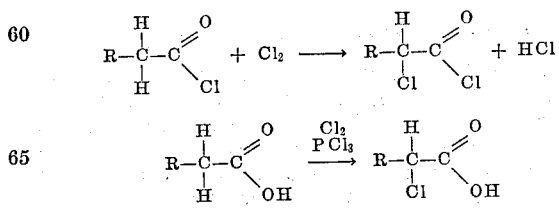

Bromine analogues of the materials above illustrated are obtainable by substituting bromine for the chlorine reactants shown.

Using the above general preparative reaction routes, typical compounds of this invention such as the following can be obtained:

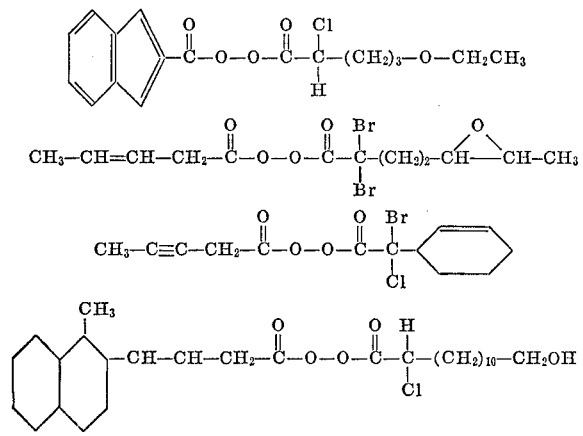

As an illustration of the preparation of the alpha halo substituted asymmetrical peroxides of this invention, the following two examples are offered. All of the compounds within the scope of the invention are readily prepared by similar techniques:

or vinyl unsaturation. Typical materials in this class are the aryl substituted olefins, such as styrene, alphachlorostyrene, and the like; the acrylic and alpha-substituted acrylic acids, esters, nitriles and amides, such as acrylic acid, acrylonitrile, alphamethacrylonitrile, methyl acrylate, ethyl acrylate, methacrylamide, and the like; and the vinyl esters, ethers, ketones and heterocyclic vinyl compounds such as vinyl chloride, vinyl acetate, vinyl propionate, vinyl butyrate, and the like. These monomers, as well as mixtures of two or more of them, can be initiated with the compounds of this invention.

Exceptionally good results have been obtained where the monomer to be polymerized is vinyl chloride. To illustrate the utility for polymerizing vinyl chloride, a series of peroxides shown in the table below were prepared by procedures analogous to the preparation of the materials in Examples I and II above.

Vinyl chloride was polymerized with each peroxide listed in accordance with the following procedure: Into a 6½ fluid ounce Coke bottle containing 94.0 g. of frozen dispersing solution were added 0.00094 mole of peroxide and 50.0 g. of vinyl chloride monomer. The Coke bottle was capped, the contents almost melted, and then the bottle was placed in a rotating constant temperature bath for 6 hours at 40° C. After the bottle was cooled, and the excess monomer vented, the polyvinyl chloride (PVC) was filtered, washed, and dried. Results are shown in Table I.

TABLE I

| | Peroxide | Synthesis results | | Utility as an initiator for vinyl chloride | |
|---|---|---|---|---|---|
| | | Percent purity | Percent yield | Average PVC yield, g. | PVC yield percent |
| 1 | Lauroyl peroxide | | | 6.05 | 12.1 |
| 2 | Acetyl 2-chloropropionyl peroxide | 91 | 30 | 18.30 | 36.6 |
| 3 | Acetyl 2-chlorobutyryl peroxide | | | 46.80 | 93.6 |
| 4 | Acetyl 2-chlorodecanoyl peroxide | 83 | 83 | 46.35 | 92.7 |
| 5 | Acetyl 2-bromobutyryl peroxide | 89 | 54 | 43.05 | 86.1 |
| 6 | Acetyl 2-bromohexadecanoyl peroxide | 33 | 44 | 45.30 | 90.6 |
| 7 | Acetyl 3-chloropropionyl peroxide | 78 | 44 | 2.65 | 5.3 |
| 8 | Acetyl 4-chlorobutyryl peroxide | 99 | 26 | 3.85 | 7.7 |
| 9 | m-Chlorobenzoyl 2-chlorobutyryl peroxide | | | 40.40 | 80.8 |
| 10 | Acetyl chloroacetyl peroxide | 100 | 42 | 1.5 | 3.0 |
| 11 | Acetyl dichloroacetyl peroxide | 79 | 43 | 0.1 | 0.2 |
| 12 | Acetyl trichloroacetyl peroxide | 50 | 26 | 4.95 | 9.9 |
| 13 | Acetyl polychlorodecanoyl peroxide [1] | 55 | 52 | 1.0 | 2.0 |
| 14 | Lauroyl dichloracetyl peroxide | 73 | 20 | 7.8 | 15.6 |
| 15 | Bis 2-chlorobutyryl peroxide | 69 | 73 | 27.15 | 54.3 |

[1] Randomly substituted at different carbon atoms as distinguished from the substantially 100% alpha carbon substitution of compound No. 4 above.

EXAMPLE I

Acetyl 2-chlorobutyryl peroxide

To 9.5 g. (0.05 mole) 40% peracetic acid in 20 cc. $H_2O$ was added 3.2 g. (0.03 mole) anhydrous sodium carbonate. The mixture was chilled to −3° C. with stirring and 7.1 g. (0.05 mole 2-chlorobutyryl chloride in 30 cc. chloroform added over 8 minutes. After a total of 40 minutes at −3 to −6° C., ether and water were added to start workup. The organic phase was washed once with cold 1% KOH solution, once with ice water, and once with cold saturated salt water. The concentrated material weighed 8.2 g., including 2.0 g. of dimethyl phthalate. Product A.O. analysis: theory, 8.14; found, 4.81; 59.1% pure; 49.5% yield.

EXAMPLE II

2-chlorobutyryl m-chlorobenzoyl peroxide

To 6.4 g. (0.06 mole) anhydrous sodium carbonate in 60 cc. $H_2O$ was added 10.2 g. (0.05 mole) m-chloroperbenzoic acid of 84.35% purity. The stirred mixture was chilled to −2° C. and 8.5 g.(0.06 mole) 2-chlorobutyryl chloride in 30 cc. chloroform was added over 17 minutes. After a total reaction time of 60 minutes, the reaction worked up as Example I and gave 15.2 g. product. Product A.O. analysis: theory, 5.77; found, 5.15; 89.30% pure; 97.7% yield.

As indicated earlier, the present materials are useful for initiating monomers having polymerizable ethylenic With respect to the results shown in the table, a comparison with lauroyl peroxide has been made since this material is presently a standard material most commonly being used at this time in the PVC industry. With respect to the performance of the remaining compounds, it is noted that materials containing less than 4 carbon atoms in the halo substituted side of a molecule, even where the halo substitution is on the alpha carbon atom, results in a substantially lesser yield than where the compositions of this invention are utilized (compare compound No. 2 with Nos. 3, 4, 5, 6 and 9). Attention is also invited to the symmetrical composition No. 15 which contains the requisite 4 carbon atoms together with alpha halo substitution, differing only from composition No. 3 by its symmetrical configuration. Again the performance of composition No. 3 (provided by this invention) is unexpectedly superior.

The remaining compounds Nos. 7, 8, 10, 12, 13 and 14 are closely related to the compositions herein claimed, but omit one or more of the specific requirements of the present compounds. Thus composition No. 7 is beta halo substituted and contains less than 4 carbon atoms in the halo substituted side of the molecule. Composition 8 contains the requisite number of carbon atoms, but is not substituted in the alpha position. Compositions 10, 11, 12 and 14 do not have the 4 carbon atom minimum required in the halo substituted side of the molecule. Composition No. 13 is not essentially alpha substituted. In all cases these materials which do not meet the requirements of this invention are substantially inferior as polymerization initiators.

In addition to efficiency as initiators, the new materials of this invention exhibit improved thermal stability, a property of practical importance where the initiators are to be stored and shipped. In a comparison between an asymmetrical diacyl peroxide of this invention and a composition meeting all of the requirements except for the presence of halogen atoms on the alpha carbon atoms on both sides of the molecule rendering it symmetrical, a substantial improvement in thermal stability is demonstrated by the new compound when the two compounds are subjected to a rapid heating test. This test consists of heating approximately 0.35 g. of peroxide in an aluminum block at a rate of 4° C. per minute and observing any evidence of decomposition. Results are as follows:

| 1 | Acetyl 2-chlorobutyryl peroxide, 56.0% pure in DMP.[1] | Vigorous decomposition between 58–73°C., with initial decomposition at 38° C. |
|---|---|---|
| 2 | Bis 2-chlorobutryl peroxide, 46.0% pure in DMP.[1] | Vigorous decomposition between 36–46° C., with initial decomposition at less than 30° C. |

[1] Dimethyl phthalate.

Although the foregoing invention has been described in some detail by way of illustration and example for purposes of clarity of understanding, it is understood that certain changes and modifications may be practiced within the spirit of the invention as limited only by the scope of the appended claims.

What is claimed is:
1. An asymmetrical organic peroxide of the formula

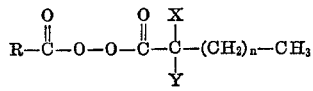

where R is an organic radical selected from the group consisting of aryl radicals, and aliphatic radicals containing other than carbon, hydrogen, oxygen and halogen having up to 20 carbon atoms provided the atom bonded directly to the adjacent carbonyl group is free from halogen substitution, X and Y are individually selected from the groups consisting of the chlorine, bromine and hydrogen atoms, provided at least one of said X and Y is a chlorine or bromine atom; and $n$ is a positive integer from 1 to about 18.

2. An organic peroxide in accordance with claim 1 wherein R is phenyl or naphthyl.

3. An organic peroxide in accordance with claim 1 wherein R is alkyl.

4. An organic peroxide in accordance with claim 1 wherein R is a methyl group.

References Cited
UNITED STATES PATENTS
2,865,904    12/1958    Seed    260—610
3,397,245    8/1968    Appell    260—610

FOREIGN PATENTS
699,768    12/1964    Canada    260—610 D

OTHER REFERENCES
Kerns et al.: "Chem. Abstract," vol. 49 pp. 13689–90 (1955).

BERNARD HELFIN, Primary Examiner
W. B. LONE, Assistant Examiner

U.S. Cl. X.R.
260—92.8 R, 348 R